US011662533B2

(12) United States Patent
Fuchs et al.

(10) Patent No.: US 11,662,533 B2
(45) Date of Patent: May 30, 2023

(54) OPTICAL CABLE WITH A CLADDING LIGHT SENSOR AND ASSOCIATED ADJUSTMENT, TEST AND MONITORING APPARATUSES

(71) Applicant: TRUMPF Laser GmbH, Schramberg (DE)

(72) Inventors: Stefan Fuchs, Boehringen (DE); Carsten Krenz, Leinfelden-Echterdingen (DE); Dominik Maier, Boesingen (DE); Wolfgang Naue, Villingendorf (DE)

(73) Assignee: TRUMPF LASER GMBH, Schramberg (DE)

(*) Notice: Subject to any disclaimer, the term of this patent is extended or adjusted under 35 U.S.C. 154(b) by 17 days.

(21) Appl. No.: 17/118,624

(22) Filed: Dec. 11, 2020

(65) Prior Publication Data

US 2021/0096308 A1 Apr. 1, 2021

Related U.S. Application Data

(63) Continuation of application No. PCT/EP2019/064874, filed on Jun. 6, 2019.

(30) Foreign Application Priority Data

Jun. 25, 2018 (DE) ...................... 10 2018 210 270.8

(51) Int. Cl.
*G02B 6/42* (2006.01)

(52) U.S. Cl.
CPC ......... *G02B 6/4225* (2013.01); *G02B 6/4227* (2013.01); *G02B 6/4296* (2013.01)

(58) Field of Classification Search
None
See application file for complete search history.

(56) References Cited

U.S. PATENT DOCUMENTS

| | | | |
|---|---|---|---|
| 5,463,710 A | 10/1995 | Filgas et al. | |
| 6,016,195 A * | 1/2000 | Peters | G01N 21/645 356/73.1 |
| 6,679,876 B2 * | 1/2004 | Kondo | A61F 9/00817 606/4 |
| 7,146,073 B2 * | 12/2006 | Wan | B23K 26/707 385/27 |
| 7,162,140 B2 * | 1/2007 | Flaig | G01N 21/15 356/237.1 |
| 7,427,165 B2 | 9/2008 | Benaron et al. | |

(Continued)

FOREIGN PATENT DOCUMENTS

| | | |
|---|---|---|
| CN | 103616165 A | 3/2014 |
| CN | 104297845 A | 1/2015 |

(Continued)

*Primary Examiner* — Omar R Rojas
(74) *Attorney, Agent, or Firm* — Leydig, Voit & Mayer, Ltd.

(57) ABSTRACT

An optical cable includes an optical fiber having a fiber core and a fiber cladding, and an output coupling plug at an output coupling-side fiber end of the optical fiber. The output coupling plug comprises at least one cladding light sensor arranged behind the output coupling-side fiber end and configured to measure cladding light that exits frontally from the fiber cladding at the output coupling-side fiber end.

11 Claims, 2 Drawing Sheets

(56) References Cited

U.S. PATENT DOCUMENTS

| | | | |
|---|---|---|---|
| 9,547,142 B1 | 1/2017 | Chen et al. | |
| 9,696,501 B2 * | 7/2017 | Kadoya | G02B 6/3843 |
| 11,187,616 B2 * | 11/2021 | Coffey | G02B 6/385 |
| 2002/0057871 A1 | 5/2002 | Fricano et al. | |
| 2002/0122173 A1 | 9/2002 | Bruns | |
| 2005/0013525 A1 | 1/2005 | Blomster et al. | |
| 2006/0013532 A1 | 1/2006 | Wan | |
| 2011/0305249 A1 | 12/2011 | Gapontsev et al. | |
| 2012/0126950 A1 | 5/2012 | Downie et al. | |

FOREIGN PATENT DOCUMENTS

| | | | |
|---|---|---|---|
| CN | 106710702 A | 5/2017 | |
| DE | 4414862 A1 | 11/1995 | |
| DE | 102008027314 A1 | 7/2009 | |
| EP | 2479594 A1 | 7/2012 | |
| EP | 2805790 A1 | 11/2014 | |
| WO | WO 9833059 A1 | 7/1998 | |
| WO | WO-0123927 A1 * | 4/2001 | G02B 6/2551 |
| WO | WO 2013095272 A1 | 6/2013 | |
| WO | WO 2017132549 A1 | 8/2017 | |
| WO | WO 2017139630 A1 | 8/2017 | |

* cited by examiner

OPTICAL CABLE WITH A CLADDING LIGHT SENSOR AND ASSOCIATED ADJUSTMENT, TEST AND MONITORING APPARATUSES

CROSS REFERENCE TO RELATED APPLICATIONS

This application is a U.S. National Phase application under 35 U.S.C. § 371 of International Application No. PCT/EP2019/064874 (WO 2020/001953 A1), filed on Jun. 6, 2019, and claims benefit to German Patent Application No. DE 10 2018 210 270.8, filed Jun. 25, 2018, which is incorporated by reference herein.

FIELD

The invention relates to an optical cable, for example a laser optical cable, comprising an optical fiber, which has a fiber core and a fiber cladding, and an output coupling plug at an output coupling-side fiber end of the optical fiber, and further relates to associated adjustment, test and monitoring apparatuses.

BACKGROUND

Optical cables are known, for example from WO 2013/095272 A1 and EP 2 805 790 A1.

For the transmission of laser light via an optical fiber, the most important goal is to transmit the radiation as well and with as little loss as possible. The best possible input coupling of the laser power into the optical fiber is decisive for this purpose, in order to transmit as many radiation components as possible via the optical fiber. The caustic which the beam to be coupled in has at the coupling plane is also crucial. The beam distribution is often a Gaussian distribution, whereby not all edge beams can be coupled into the fiber core. These edge components are outside the used fiber core diameter in the coupling plane, because of which these components are coupled into the fiber cladding (cladding), which surrounds the fiber core. These radiation components are output coupled in the largest part by a mode stripper in the input coupling plug and output coupling plug. The remaining radiation components are then guided in the cladding with greater divergence angle through the optical fiber and exit again at the end of the optical fiber in the same way with greater divergence angle. For good and efficient fiber coupling, the goal is to keep these components in the cladding as minor as possible.

Output coupling the radiation components which are coupled into the cladding immediately after the input coupling plane by means of a mode stripper on the cladding side or in the radial direction out of the cladding and detecting them using a photodiode is known. However, the photodiode can only be placed in the immediate vicinity of the mode stripper in the case of special adjustment laser optical cables, since the output coupled power has to be cooled down in this region.

WO 2013/095272 A1, which was mentioned at the outset, discloses an output plug having a sensor in order to measure laser light which was reflected back from the machining point into the fiber cladding and then exits in the radial direction from the fiber cladding and thus to control the machining process.

EP 2 805 790 A1, which was also mentioned at the outset, discloses an output plug having a sensor in order to measure laser light which exits in the radial direction from the fiber cladding and thus to control the laser power.

A separate measuring device, which is attached to a fiber, is also known from WO 2017/139630 A1. The measuring device includes an aperture and a detector, which measures the light scattered at the aperture. This measurement signal is used as an adjustment signal for the input coupling.

SUMMARY

In an embodiment, the present invention provides an optical cable. The optical cable includes an optical fiber having a fiber core and a fiber cladding, and an output coupling plug at an output coupling-side fiber end of the optical fiber. The output coupling plug comprises at least one cladding light sensor arranged behind the output coupling-side fiber end and configured to measure cladding light that exits frontally from the fiber cladding at the output coupling-side fiber end.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
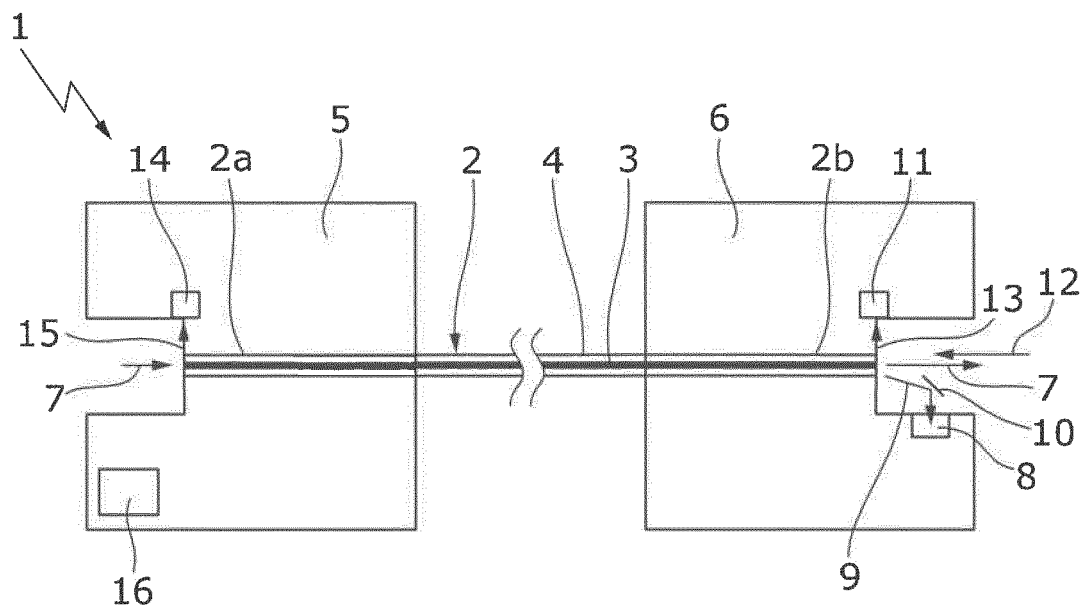
FIG. 1 shows a laser optical cable having a cladding light sensor.

The present disclosure provides improvements to an optical cable of the type mentioned at the outset with respect to occurring adjustment, test and monitoring measures and also of specifying corresponding adjustment, test and monitoring apparatuses.

According to the present disclosure, an output coupling plug comprises at least one cladding light sensor arranged behind the output coupling-side fiber end for measuring cladding light which exits frontally from the fiber cladding at the output coupling-side fiber end.

The output coupling plug comprises an integrated cladding light sensor for measuring frontally exiting cladding light, so that a separate measuring device is not required and the measurement can be performed at any time and in particular in running operation. The sensor signal thus obtained can be used, for example for referencing the optical cable itself or for coaxial adjustment of an input coupling optics in relation to the fiber core.

The output coupling plug preferably comprises a deflection optics arranged between the output coupling-side fiber end and the cladding light sensor, in particular a reflector aperture (far-field aperture), which directs at least a part of the exiting cladding light onto the at least one cladding light sensor. The edge parts of the coupled-in laser radiation guided in the fiber cladding are deflected on the exit side of the optical cable via the reflector aperture and acquired by means of the cladding light sensor (photodiode).

The optical cable, in particular the output coupling plug and/or an input coupling plug at the input coupling-side fiber end, particularly preferably comprises a data memory for storing cable-specific data. These data can be, for example, reference data in the good/new state of the optical cable and also data which have been measured after a defined radiation duration and at predetermined power values. The stored data enable the decision as to whether the optical cable can be used, and also a running and dynamic monitoring/check of the optical cable in running operation.

Furthermore, the output coupling plug can comprise at least one scattered light sensor for measuring scattered light which is scattered at an output coupling-side fiber end face or at other components in the output coupling plug, and/or an input coupling plug provided at the input coupling-side fiber end can comprise at least one scattered light sensor for measuring scattered light which is scattered at an input coupling-side fiber end face. A separate measuring device is not required for the scattered light measurement, and the scattered light measurement can be performed at any time and in particular in running operation.

The present disclosure also relates to an adjustment apparatus comprising an optical cable having an optical fiber, which has a fiber core and a fiber cladding, at least one cladding light sensor arranged behind the output coupling-side fiber end for measuring cladding light which exits frontally from the fiber cladding at the output coupling-side fiber end, and a device for displacing an input coupling-side fiber end of the optical fiber and/or an input coupling optics, which is arranged in front of the input coupling-side fiber end for coupling light into the fiber core, in relation to one another in the direction perpendicular to the fiber axis depending on the sensor signal of the at least one cladding light sensor. The input coupling optics can either be attached to the laser optical cable itself or can be a separately fastened part.

According to the present disclosure, the fiber coupling can be optimized and the input coupling optics can be adjusted for minimal divergence and minimal losses very sensitively via the minimization of the cladding light.

The at least one cladding light sensor is preferably arranged on an output coupling plug of the optical fiber or on a laser machining head, into which the output coupling plug is plugged. In the first case, the cladding light sensor is integrated into the output coupling plug, whereby the measurement and the simple adjustment of the fiber coupling linked thereto are implemented in the optical cable and an additional measuring apparatus or measuring evaluation is not required. The adjustment can thus be checked at any time and optimized if necessary. A closed control loop is also possible, whereby the fiber input coupling can be readjusted and thus kept optimal via an active control on the cladding light signal.

The present disclosure furthermore relates to a test apparatus comprising an optical cable having an optical fiber, which has a fiber core and a fiber cladding, at least one cladding light sensor arranged behind the output coupling-side fiber end for measuring cladding light which exits frontally from the fiber cladding at the output coupling-side fiber end, and an evaluation unit, which evaluates the sensor signal of the cladding light sensor. The optical cable particularly preferably comprises a data memory for storing cable-specific data of the evaluation unit and at least one scattered light sensor for measuring scattered light which is scattered on a fiber end face.

A great advantage of the test apparatus according to the present disclosure is a detailed check of the optical cable upon the initial operation on a laser device. The decision as to whether the optical cable can be used on this laser device can be taken over and carried out independently and automatically. Moreover, a running and dynamic monitoring/check is possible in running operation with respect to the starting situation. Upon the initial connecting/plugging in of the optical cable, the laser device recognizes the new optical cable and requests a referencing. In this case, the optical cable is checked for the necessary parameters by a self-test and is enabled for the working operation if the limiting values are maintained. Checks during running operation are also possible.

If an optical cable on a laser device is put into operation for the first time, multiple activities have to take place in succession in order to ensure the transmission of the laser radiation via the optical cable as efficiently and with as low loss as possible. Firstly, the optical cable is associated with the corresponding light path of the beam guiding of the laser device. Subsequently, the fiber coupling, i.e. the adjustment of the input coupling optics in relation to the fiber core, is checked. For this purpose, the cladding light in the output coupling plug and the scattered light in the input coupling can be used as the criterion. If the cladding light and scattered light are within the limiting values, which were stored especially for this device type in the laser device itself, the referencing can begin. The goal of the referencing is the determination of cladding/scattered light reference values in the optical cable, on which later monitoring of the signals can be based. These reference values have to be determined in the good/new state and without any material machining. After a defined beam duration and at predetermined power values, the signals are stored on an integrated data memory of the optical cable. However, this only takes place when the acquired signals are within the predetermined limiting values, which are also stored in the laser device.

The present disclosure also relates to a monitoring apparatus comprising an optical cable having an optical fiber, which has a fiber core and a fiber cladding, at least one cladding light sensor arranged behind the output coupling-side fiber end for measuring cladding light which exits frontally from the fiber cladding at the output coupling-side fiber end, at least one optical element (for example protective glass) in the beam path of the light exited frontally from the fiber core at the output coupling-side fiber end, at least one scattered light sensor for measuring scattered light which is scattered on the at least one optical element, and an evaluation unit, which evaluates the sensor signals of the cladding light and scattered light sensors. Advantageously, two optical elements, for example two protective glasses, are arranged in succession in the beam path of the light exited frontally from the fiber core at the output coupling-side fiber end, wherein a scattered light sensor is associated with each of the protective glasses.

If scattered light sensors are also used for monitoring optical elements in the optical cable, for example scattered light monitoring at a protective glass or at the fiber end face, soiling and damage are thus recognized early. With a suitable arrangement of the optical elements and the at least one scattered light sensor, reflected laser light or process radiation can also be detected. By using multiple scattered light sensors, soiling of an optical component can be differentiated from reflected laser light/process radiation, so that soiling of an optical element is recognized during the machining in spite of reflected laser light/process radiation.

Moreover, there is the option of carrying out a check without machining rapidly and easily, for example in a brief pause between two machining actions. The time required for changing the machining parts can be used in this case in order to move the optical cable with the machining optics to a defined location, where in the same way as during the referencing, the cladding and scattered light values without machining can be checked in relation to the original values (reference values) in the good/new state. If the sensor signals change in comparison to the beginning (reference values), action recommendations can be communicated early to the operator via the laser controller, so that an unplanned standstill can be avoided beforehand. A replacement of an optical element, for example a protective glass, can also be signaled early and thus planned.

A reference value is associated with each sensor, which was recorded upon startup without machining. If the measured values deviate later excessively strongly from the respective reference values, this is recognized by the evaluation unit and the laser device is switched off. If only one of the measured values deviates, this can be used for error determination. It can thus be determined whether the deviation originates from process radiation, from a protective glass soiling, or from a maladjustment of the fiber coupling.

An output coupling plug of the optical fiber preferably comprises the at least one cladding light sensor and a laser machining head, into which the output coupling plug is plugged, comprises the at least one optical element.

The present disclosure finally also relates to a method for monitoring an optical cable, which comprises an optical fiber having a fiber core and a fiber cladding, in running operation, comprising the following method steps: measuring cladding light which exits frontally from the fiber cladding at the output coupling-side fiber end, measuring scattered light which is scattered on at least one optical element which is arranged in the beam path of the light exited frontally from the fiber core at the output coupling-side fiber end, and evaluating the measured cladding and scattered light.

If the measured values deviate excessively strongly from the predetermined reference values, this is recognized by the evaluation and the laser light is switched off.

Scattered light, which is scattered on a fiber end face of the optical fiber or on other components, is preferably also measured and evaluated together with the measured cladding and scattered light.

The laser optical cable 1 shown in FIG. 1 comprises an optical fiber 2 having a fiber core 3 and having a fiber cladding 4 surrounding the fiber core 3, and also an input coupling plug 5 at the input coupling-side fiber end 2a and an output coupling plug 6 at the output coupling-side fiber end 2b of the optical fiber 2. At the input coupling-side fiber end 2a, laser light 7 is coupled into the fiber core 3 and output coupled from the fiber core 3 again at the output coupling-side fiber end 2b.

The decoupling plug 6 has a cladding light sensor (for example photodiode) 8 arranged behind the output coupling-side fiber end 2b in order to measure cladding light 9 which exits frontally from the fiber cladding 4 at the output coupling-side fiber end 2b. A deflection optics 10, designed, for example as a reflective far-field aperture, which directs a part of the exited cladding light 9 onto the cladding light sensor 8, is located between the output coupling-side fiber end 2b and the cladding light sensor 8 in the decoupling plug 6.

The output coupling plug 6 can optionally include a scattered light sensor 11 for measuring reflected laser light and process radiation 12 generated at the machining location, which are incident in the opposite direction on the output coupling-side fiber end face and are scattered thereon (scattered light 13) or are incident directly on the scattered light sensor 11. Accordingly, the coupling plug 5 can optionally also include a scattered light sensor 14 for measuring laser light 7 which is scattered at the input coupling-side fiber end face (scattered light 15). Furthermore, a data memory 16 can optionally be provided in the input coupling plug 5 or in the output coupling plug 6, in order to store the measurement data supplied by the cladding and scattered light sensors 8, 11, 14 as cable-specific data. The two plugs 5, 6 can be electrically connected to one another via lines (not shown here), in order to thus store sensor data of the one plug in the data memory 16 of the other plug.

Figure 2:
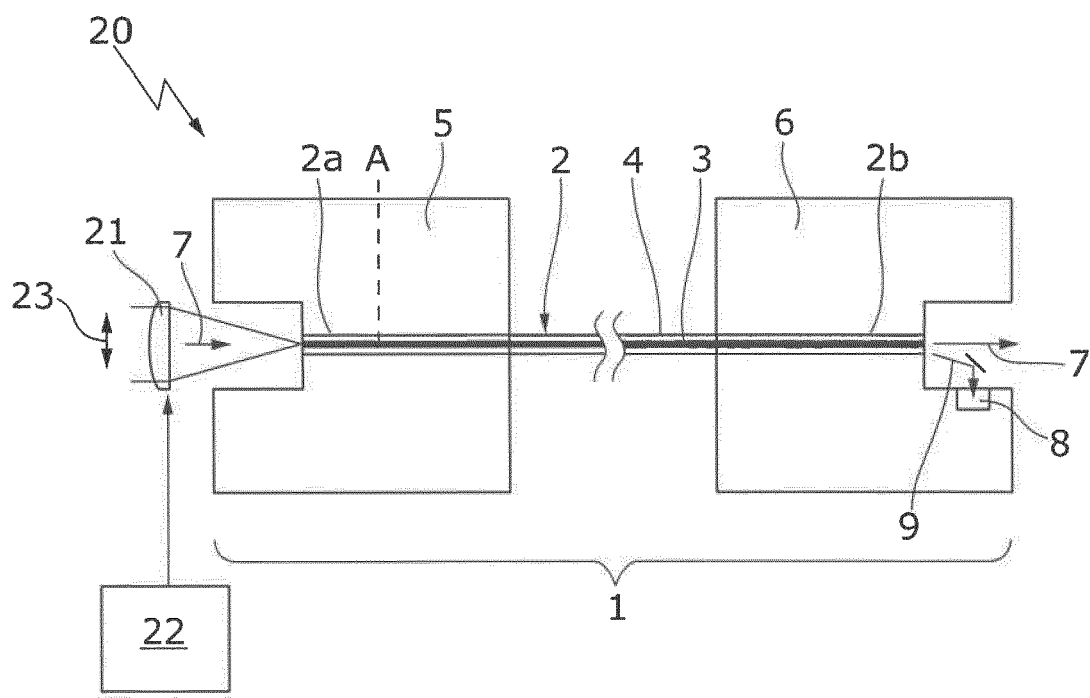
FIG. 2 shows an adjustment apparatus having a laser optical cable.

The adjustment apparatus 20 shown in FIG. 2 comprises a laser optical cable 1 having an input coupling plug 5, which includes an input coupling optics (coupling lens) 21 arranged in front of the input coupling-side fiber end 2a for coupling laser light 7 into the fiber core 3, and having an output coupling plug 6, which includes a cladding light sensor 8, and a device 22 for displacing the input coupling lens 21 in relation to the input coupling plug 5 in the direction of the double arrow 23 perpendicularly to the fiber axis A. For the adjustment of the input coupling lens 21, laser light 7 is coupled via the input coupling lens 21 into the fiber core 3 and the cladding light 9 occurring in this case is measured using the cladding light sensor 8. The coupling lens 21 is displaced depending on the sensor signal of the cladding light sensor 8 until the cladding light 9 is minimized. The coupling lens 21 is then adjusted for minimal divergence and minimal losses. A closed control loop is also possible, whereby the fiber coupling can be readjusted and thus kept optimal via an active control to the sensor signal of the cladding light sensor 8. Instead of in the output coupling plug 6 as shown, the cladding light sensor 8 can alternatively also be arranged in a laser machining head 41 (FIG. 4), into which the output coupling plug 6 is plugged.

Figure 3:
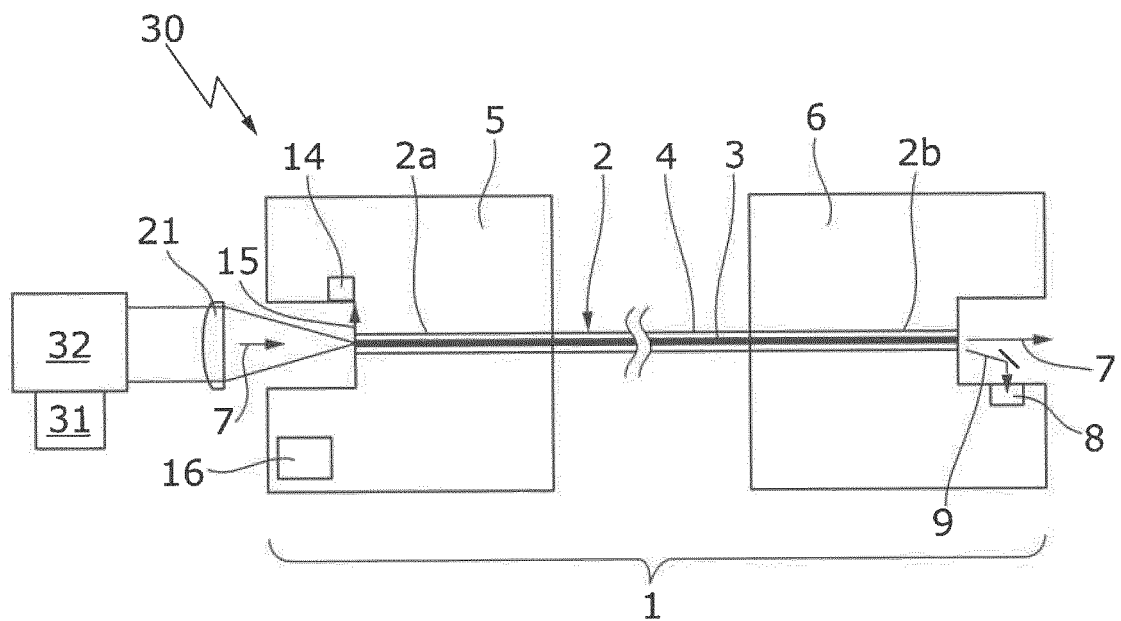
FIG. 3 shows a test apparatus having a laser optical cable.

The test device 30 shown in FIG. 3 comprises a laser optical cable 1, which includes an input coupling plug 5 having coupling lens 21, scattered light sensor 14 and data memory 16 and an output coupling plug 6 having cladding light sensor 8, as well as an external evaluation unit 31, which evaluates the sensor signals of the cladding light and scattered light sensors 8, 14 and stores them as cable-specific data in the data memory 16 of the output coupling plug 5.

If the laser optical cable 1 is put into operation for the first time on a laser device (laser beam generator) 32, multiple activities have to take place in succession in order to ensure the transmission of the laser light 7 via the laser optical cable 1 as efficiently and with as low a loss as possible. Firstly the laser optical cable 1 is associated with the corresponding light path of the beam guiding of the laser device 32, whereby the cladding light and scattered light sensors 8, 14 and the data memory 16 are also connected to the evaluation unit 31 associated with the laser device 32. Subsequently, the fiber coupling, i.e. the correct adjustment of the input coupling lens 21 in relation to the fiber core 3, is checked. For this purpose, the cladding light 9 in the output coupling plug 6 and the scattered light 15 in the input coupling can be used as a criterion. If the cladding and scattered light 9, 15 are within the limiting values, which were especially stored for this device type in the evaluation unit 31 of the laser device 32, the referencing can begin. The goal of the referencing is the determination of cladding/scattered light values which can be used as the basis for later monitoring of the signals. These reference values have to be determined in the good/new state and without any material machining. After a defined beam duration and at predetermined power values, the sensor measured values are stored by the evaluation unit 31 on the integrated data memory 16. However, this only takes place when the acquired signals are within the predetermined limiting values, which are also stored in the evaluation unit 31.

Figure 4:
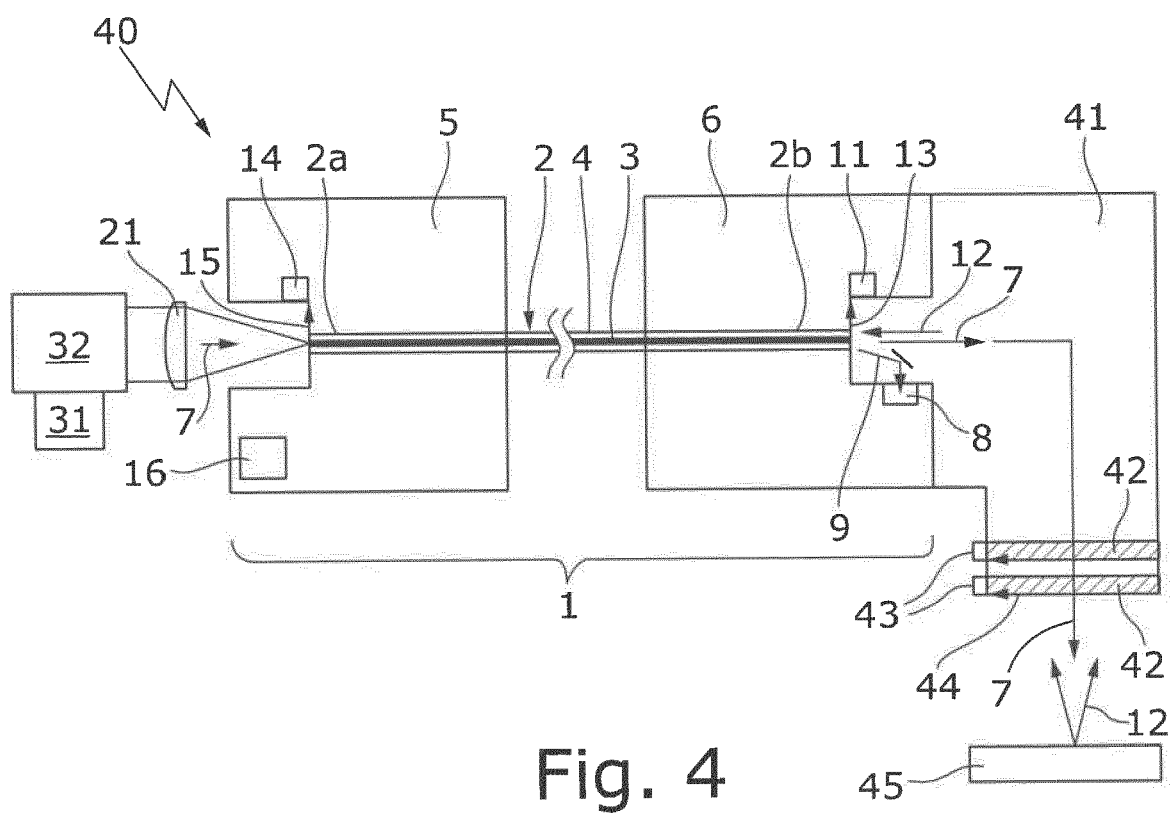
FIG. 4 shows a monitoring apparatus having a laser optical cable.

The monitoring device 40 shown in FIG. 4 comprises a laser optical cable 1, which includes an input coupling plug 5 having coupling lens 21 and scattered light sensor 14 and an output coupling plug 6 having cladding light sensor 8 and scattered light sensor 11, and also a laser machining head 41 having two protective glasses 42, which are located in the beam path of the laser light 7 exited from the fiber core 3. The output coupling plug 6 is plugged into the laser machining head 41. A scattered light sensor 43 is associated with each of the two protective glasses 42 in order to measure scattered light 44 which is scattered at the respective protective glass 42.

A reference value is associated with each sensor 8, 11, 14, 43, which is recorded when the laser optical cable 1 is first put into operation, without machining, and is stored in the data memory 16. If the sensor measured values deviate excessively strongly from the respective reference values later, this is recognized by the evaluation unit 31 and the laser device 32 is switched off. If only one of the sensor measured values deviates, this can be used for error determination. It can thus be determined by the evaluation unit 31 whether the deviation of reflected laser light and process radiation 12 which originates from a machined work piece 45 originates from a protective glass soiling or from a maladjustment of the fiber input coupling. By using multiple scattered light sensors 43 on a protective glass 42, soiling of the protective glass 42 can be differentiated from reflected laser light/process radiation 12, so that protective glass soiling is recognized during the machining.

Moreover, there is the option of carrying out a check without machining quickly and easily, for example in a brief pause between two machining actions. For this purpose, the time required for a change of the machining parts can be used in order to move the laser machining head 41 to a defined location, where the cladding and scattered light values without machining can be checked in relation to the original values (reference values) in the good/new state in the same manner as during the referencing. Upon a change of the sensor signals in comparison to the beginning (reference values), action recommendations can be communicated to the operator early via the laser controller, so that an unplanned standstill can be avoided beforehand. A replacement of a protective glass 42 can also be signaled early and thus planned.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An adjustment apparatus, comprising:
   an optical cable having an optical fiber that includes a fiber core and a fiber cladding,
   at least one cladding light sensor arranged at an output coupling-side fiber end of the optical fiber and configured to measure cladding light that exits frontally from the fiber cladding at the output coupling-side fiber end,
   a far-field aperture arranged between the output coupling-side fiber end and the cladding sensor, the far-field aperture being configured to direct, onto the at least one cladding light sensor, at least a part of the cladding light that exits frontally from the fiber cladding at the output coupling-side fiber end, and
   a device configured to displace an input coupling-side fiber end of the optical fiber and/or input coupling optics arranged in front of the input coupling-side fiber end, in relation to one another in a direction perpendicular to an optical axis of the optical fiber, depending on a sensor signal of the at least one cladding light sensor, wherein the input coupling optics is configured to focus and couple light into the fiber core.

2. The adjustment apparatus as claimed in claim 1, wherein the at least one cladding light sensor is arranged on an output coupling plug of the optical fiber or on a laser machining head, into which the output coupling plug is plugged.

3. A monitoring apparatus, comprising:
   an optical cable having an optical fiber that includes a fiber core and a fiber cladding,
   at least one cladding light sensor arranged behind the output coupling-side fiber end and configured to measure cladding light which exits frontally from the fiber cladding at the output coupling-side fiber end,
   a far-field aperture arranged between the output coupling-side fiber end and the cladding sensor, the far-field aperture being configured to direct, onto the at least one cladding light sensor, at least a part of the cladding light that exits frontally from the fiber cladding at the output coupling-side fiber end,
   at least two optical elements arranged in succession in the beam path of the light exited frontally from the fiber core at the output coupling-side fiber end, wherein the light exited frontally from the fiber core is scattered by each of the at least two optical elements,
   at least two scattered light sensors, each scattered light sensor configured to measure scattered light scattered at a respective optical element of the at least two optical element elements, and
   an evaluation unit configured to evaluate the sensor signals of the cladding light sensor and the at least two scattered light sensors.

4. The monitoring device as claimed in claim 3, wherein the at least one cladding light sensor is arranged on an output coupling plug of the optical fiber.

5. The monitoring device as claimed in claim 3, wherein the at least two optical elements are arranged on a laser machining head, into which an output coupling plug is plugged.

6. The monitoring device as claimed in claim 3, further comprising at least one additional scattered light sensor configured to measure scattered light scattered on a fiber end face of the optical fiber or on other components.

7. A method for monitoring an optical cable, which includes an optical fiber having a fiber core and a fiber cladding, in running operation, the method comprising:
   imaging, onto a far-field aperture, cladding light that exits frontally from the fiber cladding at the output coupling-side fiber end,
   measuring at least a part of the cladding light that does not pass through the far-field aperture,
   measuring scattered light scattered on at least two optical elements arranged in succession in a beam path of the light exiting frontally from the fiber core at the output coupling-side fiber end, and
   evaluating the measured cladding light and the measured scattered light.

8. The method as claimed in claim 7, wherein scattered light scattered on a fiber end face of the optical fiber or on other components, is measured and evaluated together with the measured cladding and scattered light.

9. The adjustment apparatus as claimed in claim 1, wherein the input coupling optics comprises a lens.

10. The adjustment apparatus as claimed in claim 1, wherein the device is configured to displace the input coupling-side fiber end of the optical fiber and/or the input coupling optics in relation to one another in the direction perpendicular to the optical axis of the optical fiber so that the sensor signal of the at least one cladding light sensor is minimized.

11. A method for adjusting an optical cable, which includes an optical fiber having a fiber core and a fiber cladding, and input coupling optics arranged in front of an input coupling-side fiber end of the optical fiber, wherein the input coupling optics is configured to focus and couple light into the fiber core, the method comprising:
   imaging cladding light, which exits frontally from the fiber cladding at an output coupling-side fiber end, onto a far-field aperture,
   measuring at least a part of the cladding light that does not pass through the far-field aperture, and
   displacing, based on the measured cladding light, the input coupling-side fiber end and the input coupling optics in relation to one another in a direction perpendicular to an optical axis of the optical fiber.

* * * * *